US012026310B2

(12) United States Patent
Yu et al.

(10) Patent No.: US 12,026,310 B2
(45) Date of Patent: Jul. 2, 2024

(54) CONTROLLING A USER INTERFACE WITH A TRACKPAD AND A SMART WATCH

(71) Applicant: NTT DOCOMO, INC., Tokyo (JP)

(72) Inventors: Young-Cheol Yu, Palo Alto, CA (US); Yuya Tanaka, Palo Alto, CA (US); Yoji Osako, Palo Alto, CA (US)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 18/119,715

(22) Filed: Mar. 9, 2023

(65) Prior Publication Data
US 2024/0036646 A1 Feb. 1, 2024

Related U.S. Application Data

(60) Provisional application No. 63/393,181, filed on Jul. 28, 2022, provisional application No. 63/393,178, filed on Jul. 28, 2022.

(51) Int. Cl.
G06F 3/01 (2006.01)
G06F 3/0485 (2022.01)
G06F 3/0488 (2022.01)

(52) U.S. Cl.
CPC ............ *G06F 3/014* (2013.01); *G06F 3/0485* (2013.01); *G06F 3/0488* (2013.01); *G06F 2203/04104* (2013.01)

(58) Field of Classification Search
CPC ...... G06F 3/014; G06F 3/0485; G06F 3/0488; G06F 2203/04104; G06F 2203/04807; G06F 1/1686; G06F 3/0482; G06F 1/163; G06F 3/011; G06F 3/017; G06F 3/0346; G06F 3/04815
See application file for complete search history.

(56) References Cited

U.S. PATENT DOCUMENTS

| 10,203,762 B2 * | 2/2019 | Bradski ............... H04N 21/414 |
| 11,200,869 B1 * | 12/2021 | Post .................... G06F 3/04842 |
| 2011/0007008 A1 * | 1/2011 | Algreatly ............ G06F 3/04886 715/702 |
| 2014/0285520 A1 * | 9/2014 | Park ...................... G06T 19/006 345/633 |
| 2016/0054791 A1 * | 2/2016 | Mullins ................. G04G 21/04 345/173 |
| 2016/0117141 A1 * | 4/2016 | Ro ...................... G06F 3/04883 715/748 |
| 2019/0146219 A1 * | 5/2019 | Rodriguez, II ......... G06F 21/36 345/633 |
| 2023/0315248 A1 * | 10/2023 | Roberts ............... G06F 3/04815 345/156 |

OTHER PUBLICATIONS

Office Action received in related Japanese Application No. 2023-042856, mailed May 7, 2024, 8 pages.

* cited by examiner

*Primary Examiner* — Grant Sitta
(74) *Attorney, Agent, or Firm* — Womble Bond Dickinson (US) LLP

(57) ABSTRACT

Methods and apparatuses for controlling a user interface with a wearable device, such as a smart watch, are disclosed. In some embodiments, the method includes detecting, by an extend reality (XR) device, a wearable device, communicably connecting the XR device to the wearable device, and manipulating a user interface in a virtual environment displayed on a display in the XR device with the wearable device.

12 Claims, 8 Drawing Sheets

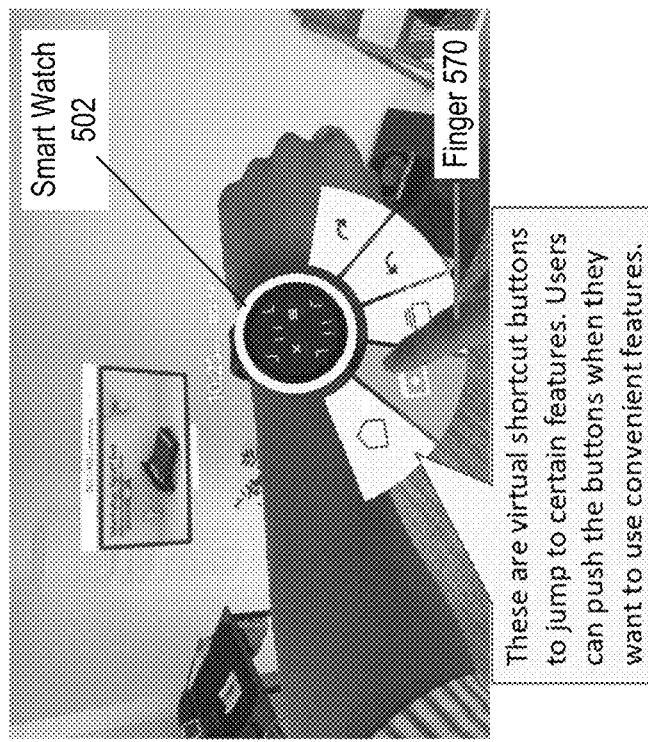
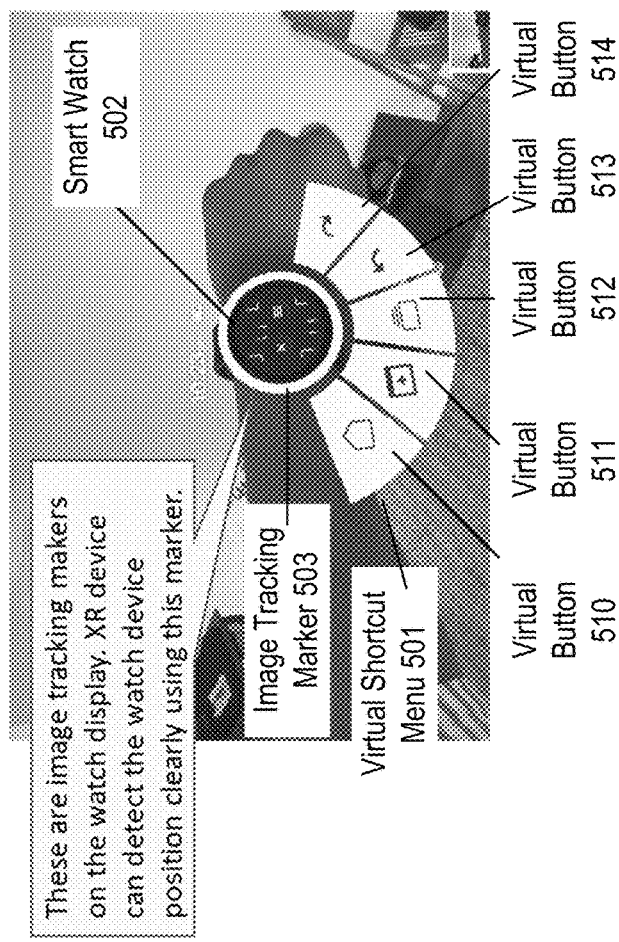
FIG. 5A
FIG. 5B

US 12,026,310 B2

CONTROLLING A USER INTERFACE WITH A TRACKPAD AND A SMART WATCH

PRIORITY

The present application claims the benefit of U.S. Provisional Patent Application No: 63/393,178, filed on Jul. 28, 2022 and entitled "CONTROLLING A USER INTERFACE WITH A TRACKPAD AND A SMART WATCH" and U.S. Provisional Patent Application No. 63/393,181, filed on Jul. 28, 2022 and entitled "CONTROLLING A USER INTERFACE: WITH AN XR SHORTCUT FEATURE AND A SMART WATCH.", both of which are incorporated by reference in its entirety.

BACKGROUND

Artificial reality, extended reality, or extra reality (collectively "XR") is a form of reality that has been adjusted in some manner before presentation to a user, which may include, e.g., virtual reality (VR), augmented reality (AR), mixed reality (MR), hybrid reality, or some combination and/or derivatives thereof. Various XR environments exist, allowing representations of users to move about and speak with one another. However, the user interface (UI) and user experience (UX) are limited. For example, the user interfaces often rely on hand tracking that doesn't always operate effectively and may even be uncomfortable for users. That is, in current existing UI/UX used by XR devices, controlling objects displayed in a user interface of an XR device are performed via hand gestures captured by the XR device. These hand gestures are not accurate.

SUMMARY

The present disclosure is directed to controlling a user interface with a wearable device, such as, for example, a smart watch, substantially as shown in and/or described in connection with at least one of the Figures, as set forth more completely in the claims.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

FIGS. 5A and 5B illustrate some embodiments of a virtual shortcut menu with virtual buttons around a smart watch for controlling a user interface in a virtual environment generated by an XR device.

DETAILED DESCRIPTION

Figure 1:
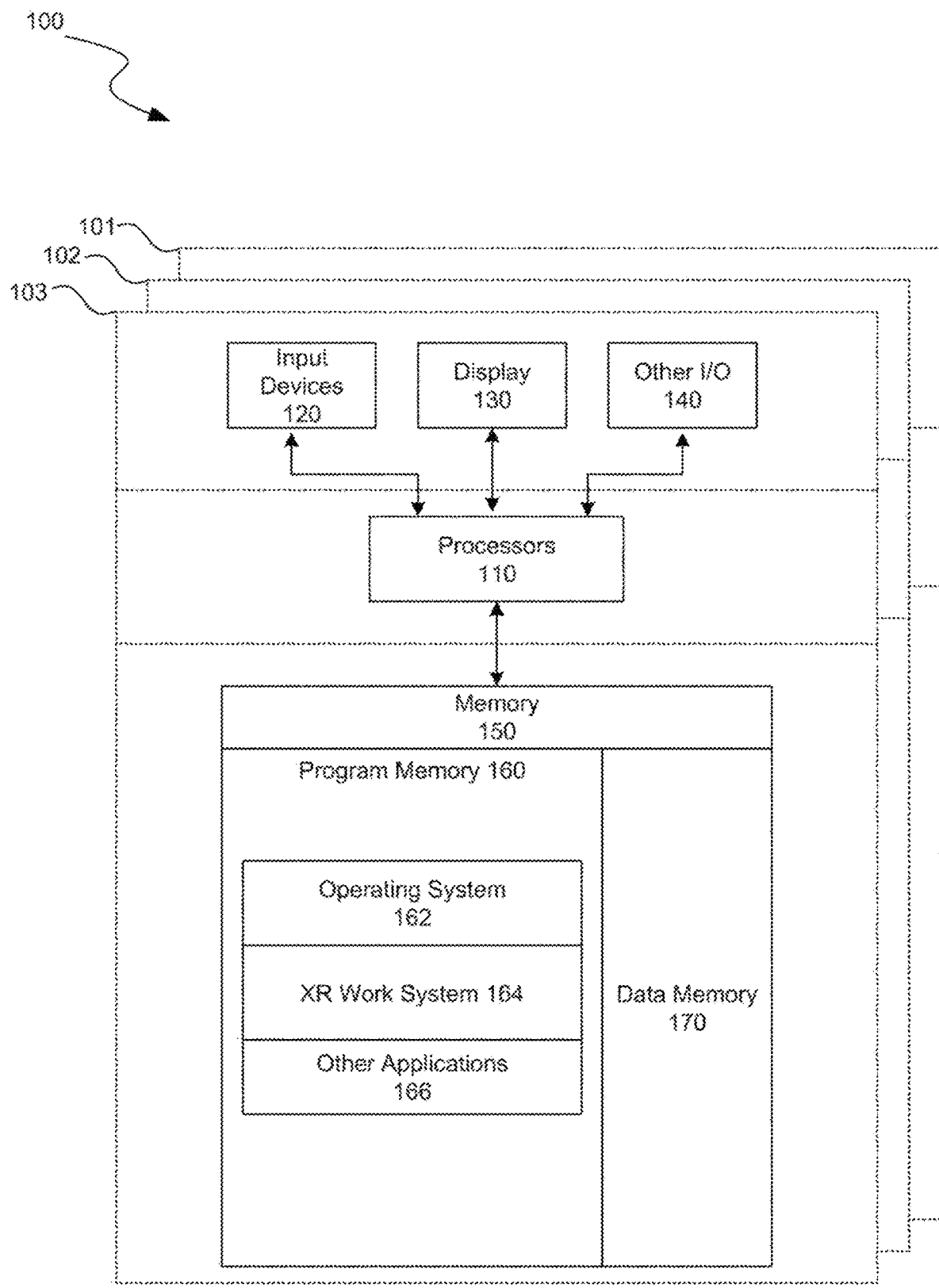
FIG. 1 is a block diagram illustrating an overview of devices on which some implementations of the disclosed technology can operate

In the following description, numerous details are set forth to provide a more thorough explanation of the present disclosure. It will be apparent, however, to one skilled in the art, that the present disclosure may be practiced without these specific details. In other instances, well-known structures and devices are shown in block diagram form, rather than in detail, to avoid obscuring the present disclosure.

Methods and apparatuses for controlling a user interface with a wearable device, such as, for example, a smart watch, are disclosed. In some embodiments, the method includes detecting, by an extend reality (XR) device, a wearable device, communicably connecting the XR device to the wearable device, and manipulating a user interface in a virtual environment displayed on a display in the XR device with the wearable device. The manipulations can be based on a user performing movements, such as movements with one or more fingers, across a display touch surface of the wearable device. The manipulations can also be based on finger or hand movements made in relation to the wearable device in conjunction with one or more virtual graphical user elements (GUIs) being displayed by the XR device in proximity to the wearable device in the virtual environment. The XR device may be implemented as a head-mounted display (HMD) system, an example of which is described below.

Embodiments of the disclosed technology may include or be implemented in conjunction with an artificial reality, extended reality, or extended reality (collectively "XR"), which is a form of reality that has been adjusted in some manner before presentation to a user, which may include, e.g., virtual reality (VR), augmented reality (AR), mixed reality (MR), hybrid reality, or some combination and/or derivatives thereof. Extended reality content may include completely generated content or generated content combined with captured content (e.g., real-world photographs). Additionally, in some embodiments, extended reality may be associated with applications, products, accessories, services, or some combination thereof, that are, e.g., used to perform activities in an artificial reality. The extended reality system that provides the extended reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real-world after they have passed through a computing system. For example, a tablet with a camera on the back can capture images of the real-world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real-world. For example, a MR headset could be shaped as a pair of glasses with a pass-through display, which allows light from the real-world to pass-through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Several implementations are discussed below in more detail in reference to the figures. FIG. 1 is a block diagram illustrating an overview of devices on which some implementations of the disclosed technology can operate. The devices can comprise hardware components of a computing system 100 that can create, administer, and provide interaction modes for an XR environment. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye or head direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, XR work system 164, and other application programs 166. Memory 150 can also include data memory 170 that can include information to be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
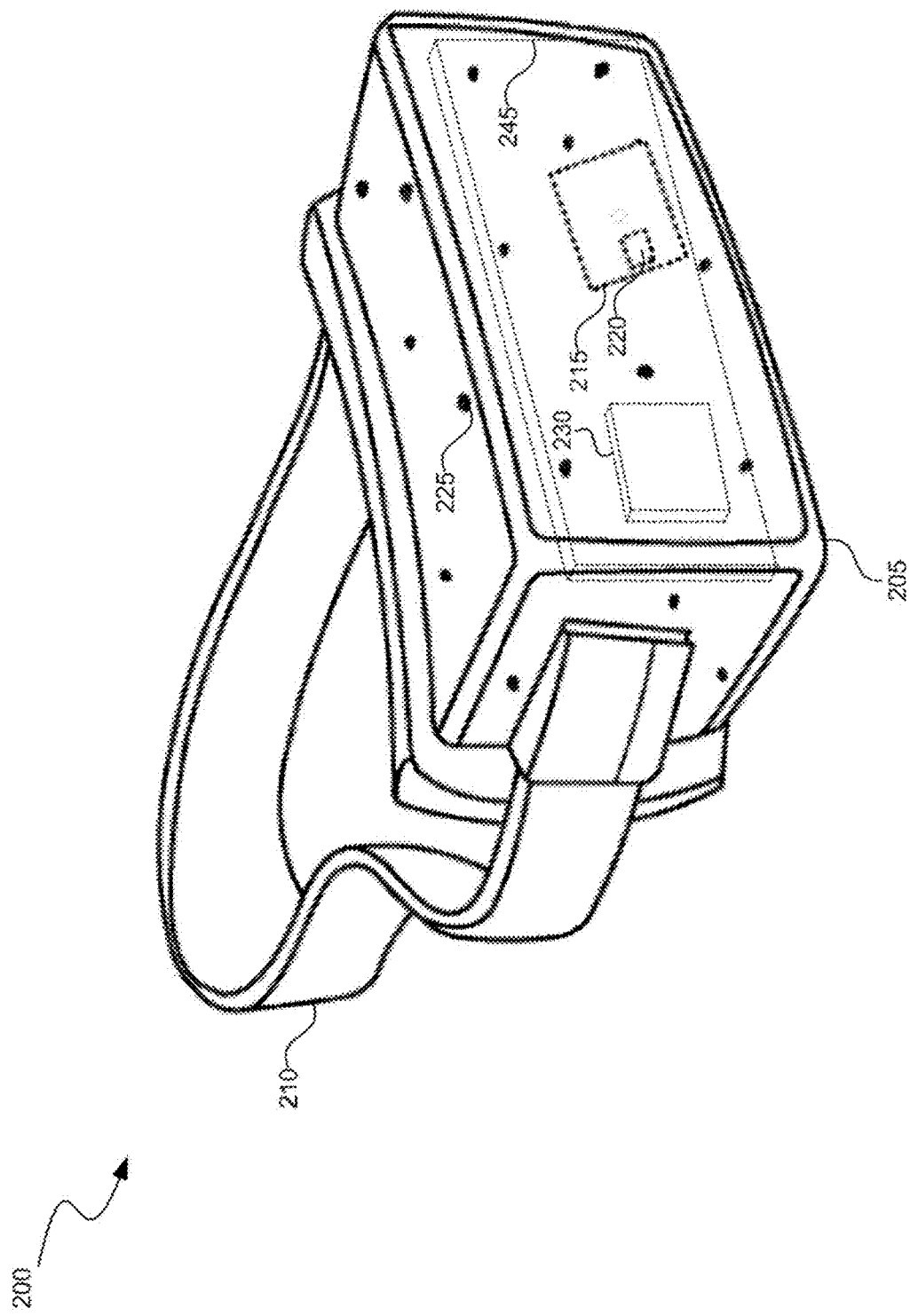
FIG. 2A is a wire diagram of a head-mounted display (HMD) in accordance with some embodiments.

FIG. 2A is a wire diagram of a head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real-world and in a virtual environment in three degrees of freedom (3 DoF) or six degrees of freedom (6 DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof.

One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
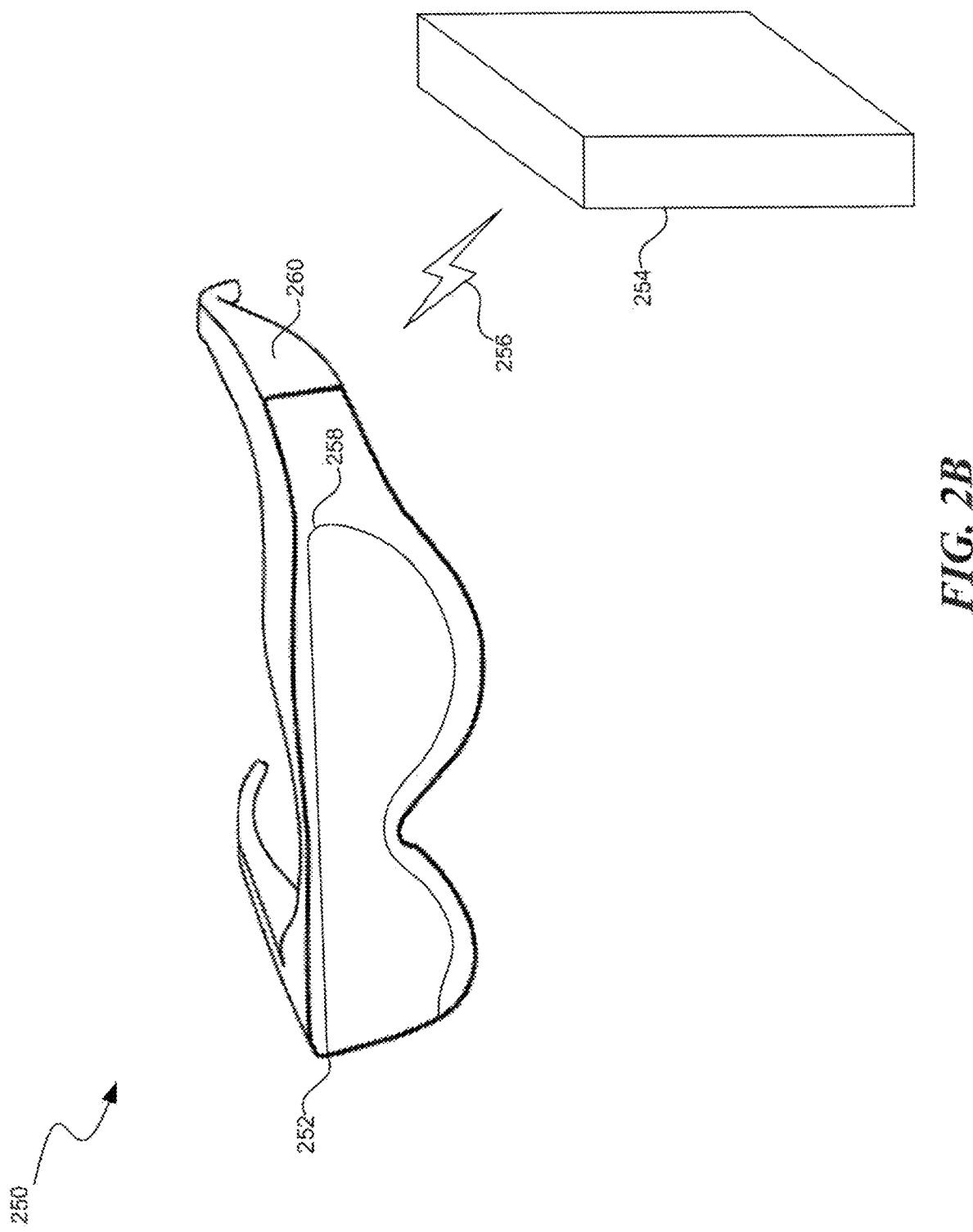
FIG. 2B is a wire diagram of a mixed reality HMD system which includes a mixed reality HMD and a core processing component.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real-world.

Similarly, to the HMD 200, the HMD system 250 can also include motion and position tracking units, cameras, light sources, etc., which allow the HMD system 250 to, e.g., track itself in 3 DoF or 6 DoF, track portions of the user (e.g., hands, feet, head, or other body parts), map virtual objects to appear as stationary as the HMD 252 moves, and have virtual objects react to gestures and other real-world objects.

In various implementations, the HMD 200 or 250 can also include additional subsystems, such as an eye tracking unit, a head tracking unit, an audio system, various network components, etc. To monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions.

User Interface Control Via a Trackpad with a Smart Watch

In some embodiments, the user can control a user interface (UI) being displayed in a virtual environment generated by the XR device using a wearable device such as, for example, a smart watch, in a manner similar to using a trackpad of a laptop computer system. In some embodiments, the XR device enables a user to use a smart watch or other wearable device to control a cursor and/or make selections of graphical user interface (GUI) elements in a user interface of the virtual environment generated by the XR device. This is advantageous in that the user can control a cursor on a smart watch without watching their hands while also providing physical feedback to the user. Hence, the users can get a touch feeling from controlling the cursor even though they are interacting in the virtual environment. Additionally beneficial is that this technique is very accurate because the trackpad is linked to the smart watch's device display touch sensor.

In some embodiments, the smart watch is communicably connected to the XR device. In some embodiments, the connection is a wireless connection, such as, for example, through a Bluetooth connection as a result of pairing. In some other embodiments, other short range wireless communication is used between the smart watch (wearable device) and the XR device, such as, for example, ZigBee, UWB, infrared, etc. The link between the smart watch and the XR device can include a link between the display touch sensor of the display surface of the smart watch.

In use, in response to the user manipulating (e.g., moving one or more fingers over, tapping, etc.) the display surface of the smart watch, touch data obtained from the touch sensor of the smart watch device is sent to the XR device and translated into one or more commands that the XR device performs. Thus, using the touch function of the smart watch device, the user interface and objects displayed the virtual environment by the XR device may be manipulated. In some embodiments, the manipulation includes moving and/or controlling a cursor or other GUI element, scrolling a window (e.g., a browser window), selecting one or more objects in the user interface of the XR device), rotating an object, scaling an object, moving an object, etc. Thus, by detecting the motion of the user with respect to the touchpad interface of the smart watch (or phone) device, the user can control the XR device to manipulate the user interface.

Figures 3A, 3B:
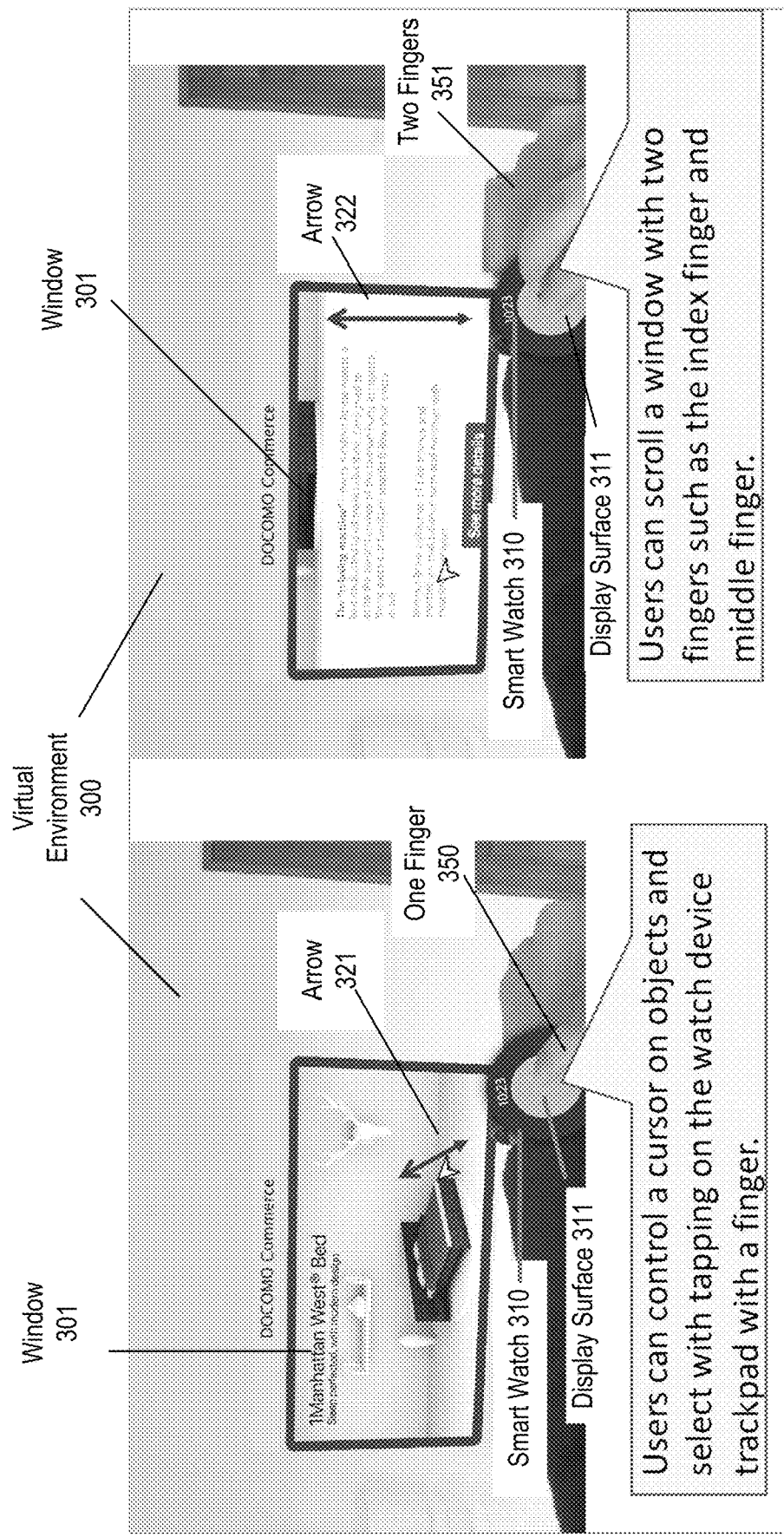
FIGS. 3A and 3B illustrate the use of the display surface of a smart watch as a trackpad to control a cursor with the trackpad.

FIGS. 3A and 3B illustrate the use of the display surface of a smart watch as a trackpad to control a cursor with the trackpad. Referring to FIG. 3A, a smart watch 310 with a display surface 311 is shown in conjunction with a user interface window 301 in a virtual environment 300. A cursor 320 is shown on window 301. By moving one or more fingers on or across the display surface of trackpad 311 of smart watch 310, users can control cursor 320 with display surface 311. For example, users can move a cursor onto one or more objects being displayed in the user interface window 301 and select them by tapping on the display surface 311 of smart watch 310 with one or more fingers, such as finger 350. The user can slide finger 350 across the display surface 311 of smart watch 310 with a finger, such as finder 350, causing cursor 320 to move within window 301. An example of the movement of cursor 320 is represented by arrow 321. Note that cursor 320 can be moved in many, if not all, directions, not simply the directions represented by arrow 321. In FIG. 3B, users can scroll a window, such as window 461 in virtual environment 460, with multiple (e.g., two or more) fingers such as with, for example, the index and middle fingers 351, by moving them along the display surface 311 of smart watch 310, such that display surface 311 of smart watch 310 acts as a trackpad.

Note that when a user interacts with display surface 311 with, for example, one or more fingers, the touch sensor of display surface 311 captures touch data from the finger movements and sends that touch to the XR device. In some embodiments, the touch data is indicative of one or more of position, orientation, velocity, direction, distance, etc. In response, the XR device translates or otherwise converts the data into commands (e.g., cursor control commands, window control commands, object/GUI element selection commands) that the XR device performs with respect to the virtual environment.

Figure 4:
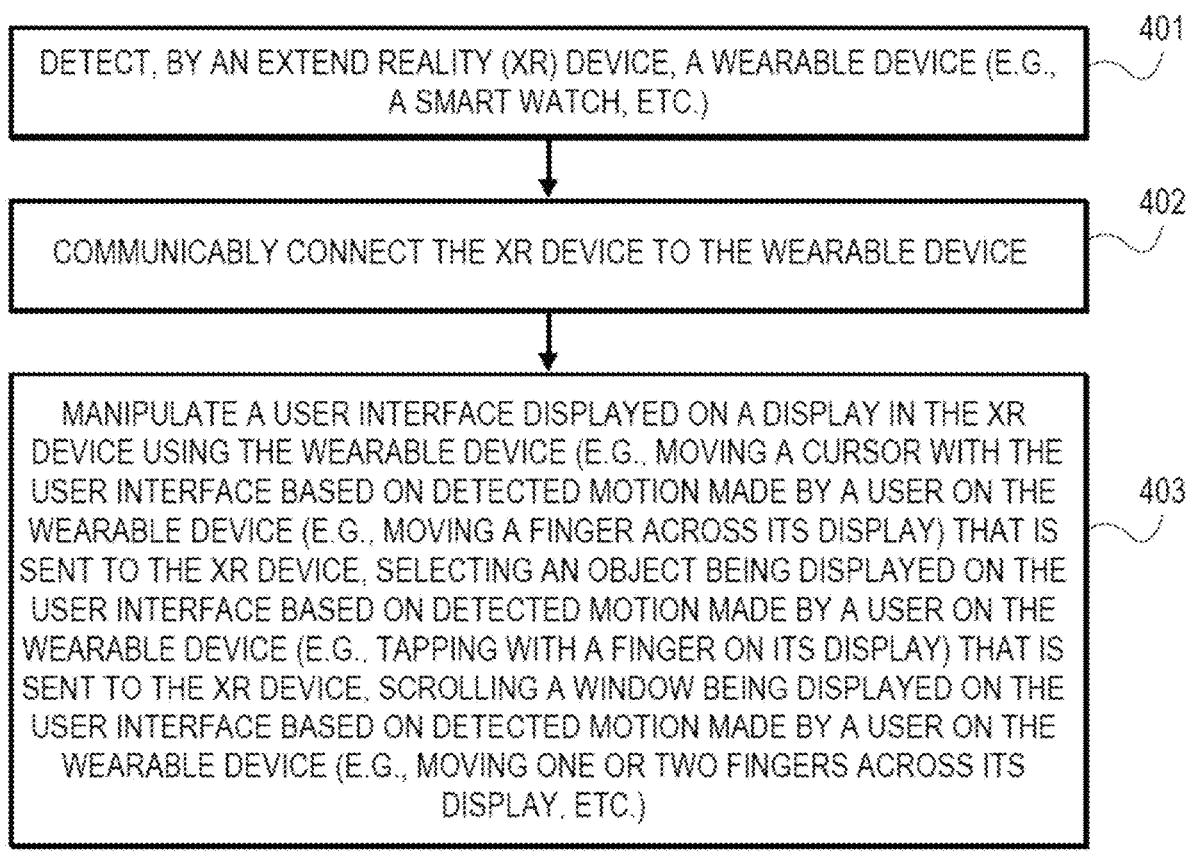
FIG. 4 is a flow diagram of some embodiments of a process for using a track pad with a smartwatch to control the user interface in an extended reality (XR) device.

FIG. 4 is a flow diagram of some embodiments of a process for using a track pad with a smartwatch to control the user interface in an extended reality (XR) device. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three.

Referring to FIG. 4, the process begins by processing logic detecting a wearable device worn by the user (e.g., a wearable device) (processing block 401). In some embodiments, the detection is performed by the XR device. In some embodiments, the device worn by the user comprises a watch. In some embodiments, the watch comprising a smart watch. In some other embodiments, the device may be other wearable devices.

After detecting the presence of the smart watch, processing logic communicably connects the XR device to the smart watch device (processing block 402). In some embodiments, the communication between the XR device and the smart watch is performed wirelessly. In some embodiments, this connection comprises a Bluetooth or the short range wireless communication.

Once the XR device and the smart watch are in communication with each other, processing logic manipulates the user interface generated and displayed on the display in the XR device using the smart watch (processing block 403). In some embodiments, manipulating the user interface comprises moving a cursor in the user interface user based on the detected motion made by the user on the smart watch. The detected motion may comprise a user moving one or more fingers across the display surface of the smart watch. This detected motion is captured by the touch sensor of the smart watch and the touch data is sent by the smart watch to the XR device. In turn, the XR device translates the touch data into a command or action that the XR device performs with respect to an object or other GUI element being displayed in the user interface of the XR device.

In some other embodiments, manipulating the user interface comprises selecting an object being displayed on user interface in the virtual environment generated by the XR device based on the detected motion made by this user on the smart watch. In some embodiments, this detected motion can comprise the user, for example, tapping their finger(s) on the display of the smart watch. This motion is captured by the smart watch in the form of touch data, and the touch data is sent by the smart watch to the XR device, which translates the touch data into a command or action performed by the XR device on an object displayed in the user interface of the XR device.

In some other embodiments, manipulating the user interface comprises scrolling a window being displayed on the user interface based on detected motion made be user on the smart watch. In some embodiments, the detected motion comprises the movement of one or more fingers across the display of the smart watch. Again, this motion is captured by the touch sensor of the display surface of the smart watch, and the resulting touch data is sent to the XR device, which translates the touch data into a command or action performed by the XR device on an object displayed in the user interface of the XR device. In this case, the command/action is the scrolling of a window in the user interface in the virtual environment generated by the XR device.

User Interface Control with an XR Shortcut Feature and a Smart Watch

In current XR systems, specific actions may be performed by pinching for certain seconds, pushing a certain button, or performing other such functions. However, current XR devices do not use virtual shortcut buttons in proximity of a smart watch (or other wearable device) to indicate shortcuts a user wished to make with respect to a user interface displayed in a virtual environment by the XR device.

In some embodiments, the XR device displays a virtual shortcut menu having a set of one or more shortcut virtual buttons in the user interface generated by an XR device that appear around the smart watch. In some embodiments, the position of the shortcut menu is determined or calculated according to one or more image tracking markers on the smart watch. In some embodiments, the one or more image tracking markers appear on the display surface of the smart watch. Using this technique, the user can use the virtual shortcut button menu simply by watching the smart watch device and performing a gesture, such as, for example, a button pushing gesture with one or more fingers onto any one of the virtual buttons. In some embodiments, the virtual buttons are scalable and follow the watch device position due to the one or more image tracking markers.

The use of the virtual buttons makes it easy for the user to select actions and/or events to occur in the user interface in the virtual environment generated and displayed by the XR device. In some embodiments, the XR device performs the selection using hand tracking and recognizing a hand gesture. That is, the user performs a gesture with their hand such as tapping with a finger on one of the virtual buttons and image cameras of the XR device captures data associated with the user's movement. The XR device determines a gesture based on the data corresponding to the movement, which can include one or more of position, orientation, velocity, direction, distance, etc. Based on the identified gesture, the XR device determines which of the virtual buttons the user has selected and wants to invoke and performs the action(s) and/or commands associated with that virtual button. Thus, in this manner, through the use of their smart watch, the user can see a virtual shortcut interface and control a user interface in a virtual environment generated and displayed by an XR device.

FIGS. 5A and 5B illustrate some embodiments of a virtual shortcut menu with virtual buttons around a smart watch for controlling a user interface in a virtual environment generated by an XR device. Referring to FIG. 5A, the virtual shortcut menu 501 is displayed in proximity to smart watch 502 by an XR device as part of a user interface in a virtual environment. In some embodiment, the XR device uses image tracking marker 503 on smart watch 502 to detect the position of smart watch 502. Based on the position of smart watch 502, the XR device can position virtual shortcut menu 501 in proximity to smart watch 502. In some embodiments, the XR device positions virtual shortcut menu 501 around a portion of smart watch 502. Note that virtual shortcut menu 501 and/or the virtual buttons thereof, can be located on one, more or all sides of smart watch 502.

In some embodiments, virtual shortcut interface 501 includes multiple virtual buttons that can be selected by a user to enable the user to jump to certain features such as, for example, the performance of one or more functions or actions. The user can push the buttons they want to use to invoke the features associated with each of the virtual buttons.

In FIGS. 5A and 5B, virtual shortcut interface 501 includes five virtual buttons, though the techniques disclosed herein can have more or less than five virtual buttons. In some embodiments, virtual shortcut interface 501 includes a home button 510, button 511 for opening a browser (or other window), button 512 for checking open applications, a back button 513 and a forward button 514. When selected, home button 510 enables user to go to the home screen in the user interface of the virtual environment, which can be a start screen or a main menu (e.g., redisplay of virtual shortcut interface 501). When selected, back button 513 allows an end user to navigate to a previously viewed page (e.g., a web page, etc.) in the user interface. When selected, forward button 514 allows an end user to navigate to a previously viewed page (e.g., a web page, etc.) in the user interface that was originally viewed after the current page. In some embodiments, one of the virtual buttons of virtual shortcut interface 501, when selected, causes virtual shortcut interface 501 to display another set of virtual buttons. The new set of virtual buttons can include one or more buttons in the previously displayed set of buttons in virtual shortcut interface 501. In some embodiments, virtual shortcut interface 501 is customizable and can have any set of buttons a user (or users) want to include.

In some embodiments, the virtual buttons in virtual shortcut interface 501 are configurable by the user. In this way, the user can use virtual shortcut interface 501 to interact with the user interface in the virtual environment generated and displayed by the XR device More specifically, through the use of hand tracking and image recognition performed by the XR device, the XR device can determine that the user's looking at smart watch 502 and then display the virtual shortcut interface 503 in response to that determination. That is, in some embodiments, the real smart watch screen is changed as shown in 502 (while the smart watch shows normal screen if user doesn't wear XR device). At this point, the user can make a hand gesture to select one or more of the virtual buttons on FIG. 5B illustrates selecting one of virtual shortcut buttons 510-514 in some embodiments of a virtual shortcut menu interface to cause a feature associated with that virtual button to be invoked by the XR device. Referring to FIG. 5B, the user moves finger 570 and performs a push (press) gesture with respect to virtual button 511. In some embodiments, any push gesture made with respect to one of the virtual buttons 510-514 is recognized by the XR device using hand tracking with one or more cameras in the XR device. These features can include going to a home button, forward or backward through previously viewed display windows.

Figure 5C:
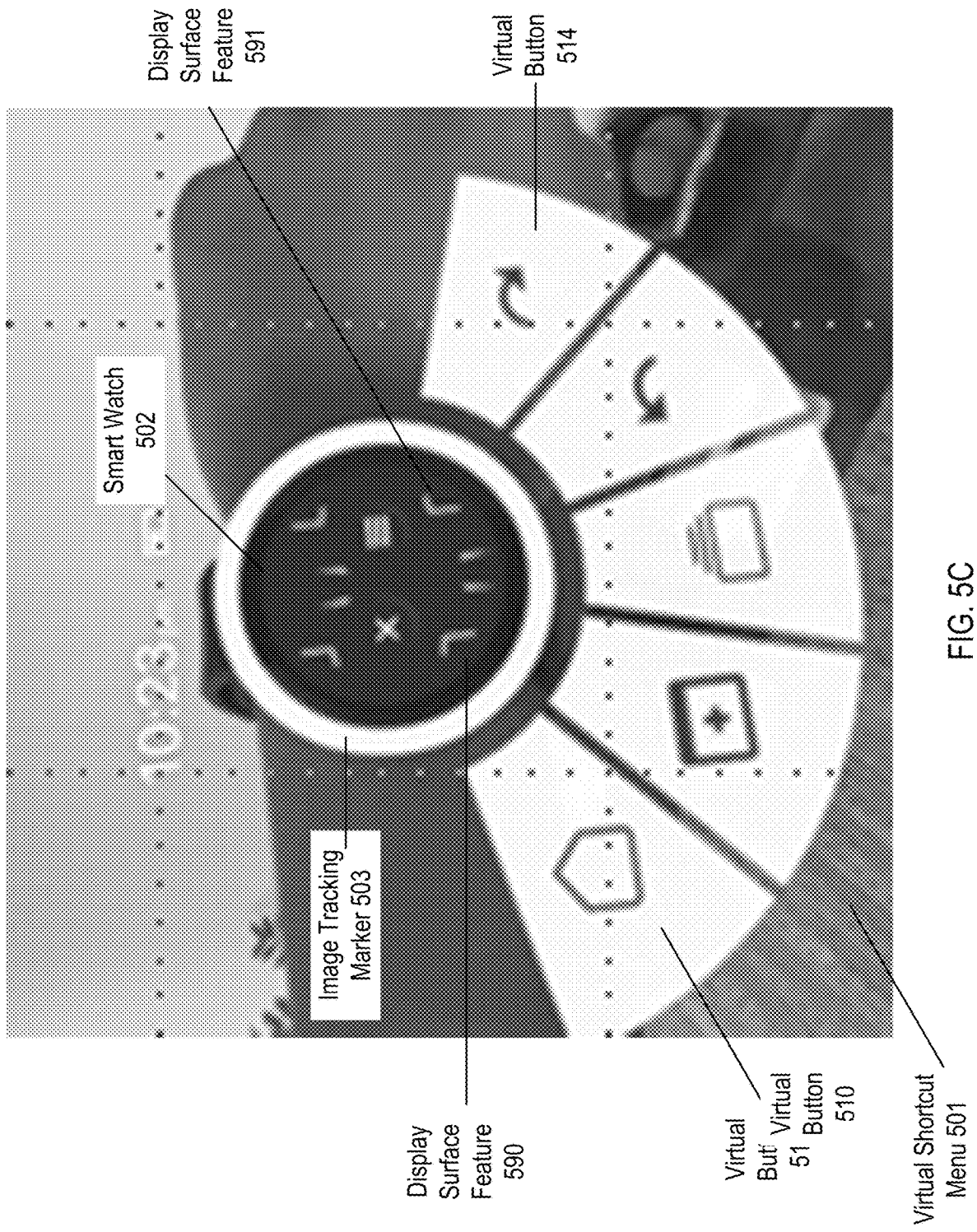
FIG. 5C illustrates some embodiments of the display surface of a smart watch.

In some embodiments, the display surface of the smart watch can used to select one or more of the features selectable by through the use of the virtual shortcut interface. In such a case, the display surface of the smart watch is used as a trackpad as described above and features may be invoked by touching the display surface. In some embodiments, predetermined sections of the display surface are associated with one or more invokable features such that when the user taps or otherwise touches each of those predetermined sections, then its associated feature(s) can be invoked. FIG. 5C illustrates some embodiments of the display surface of a smart watch. Referring to FIG. 5C, display surface element 590 can be associated with home button 510 and the user can tap display surface element 590 to invoke the features of home button 510. Similarly, display surface element 591 can be associated with forward button 514 and the user can tap display surface element 591 to invoke the features of home button 514. These are merely examples and others can be implemented.

Figure 6:
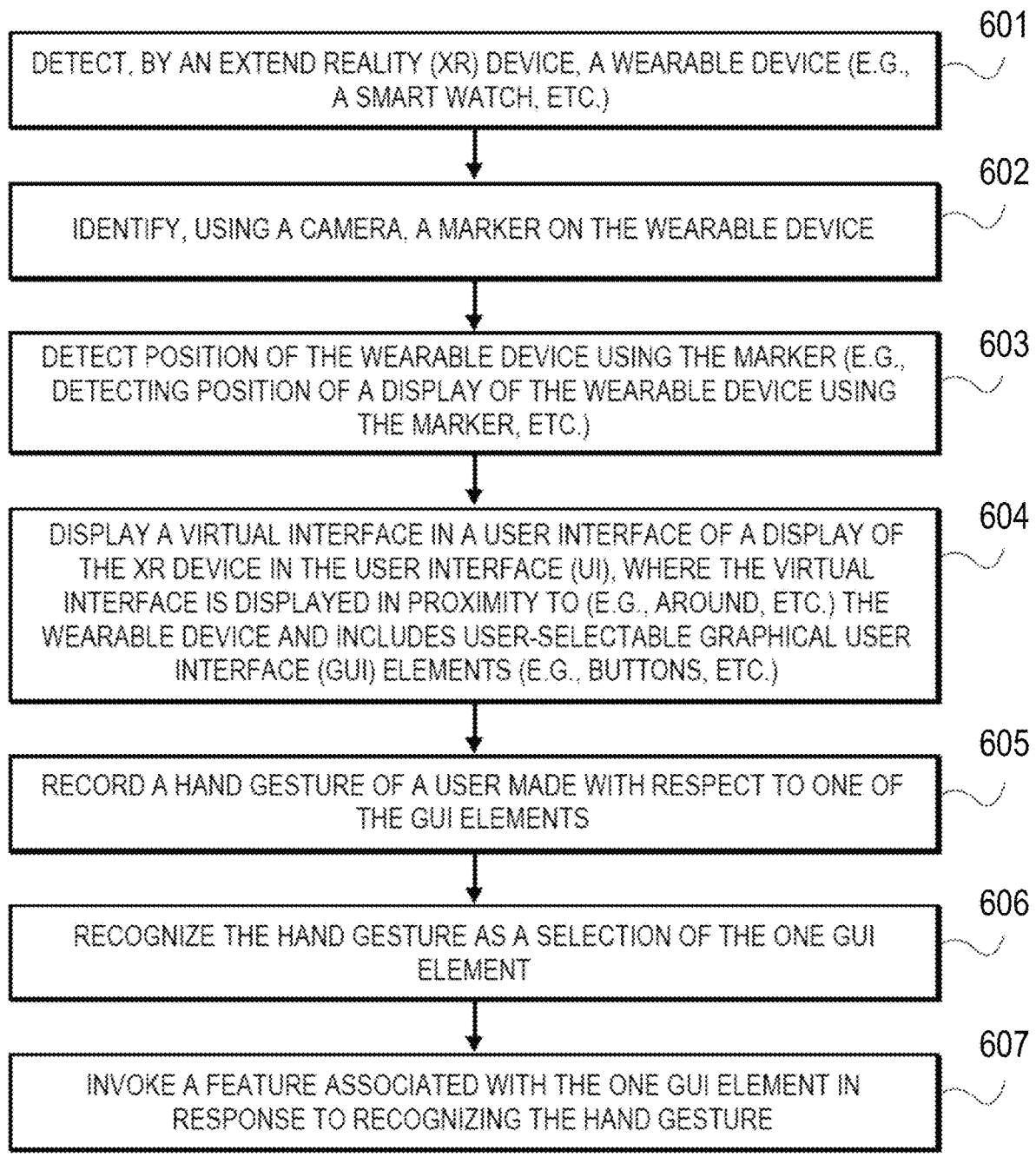
FIG. 6 is a flow diagram of some embodiments of a process for using a XR shortcut interface with a smart watch or other wearable device to control a user interface in an XR device.

FIG. 6 is a flow diagram of some embodiments of a process for using a XR shortcut interface with a smart watch or other wearable device to control a user interface in an XR device. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three.

Referring to FIG. 6, the process begins processing logic of an XR device processing logic detecting a smart watch (or other wearable device) (processing block 601). Next, processing logic identifies a marker(s) on a smart watch using a camera (processing block 602) and processing logic detects the position of the wearable device using the marker (s) (processing block 603). In some embodiments, detecting a position of the wearable device using the marker comprises detecting the position of the marker on a display of the smart watch.

In response to detecting the smart watch, processing logic displays a virtual interface in the user interface being displayed by the XR device in the XR device display (processing block 604). In some embodiments, the virtual interface is displayed in proximity to the wearable device and includes user selectable graphical user interface (GUI) elements. In some embodiments, the virtual interface is displayed in proximity to the smart watch by displaying the virtual interface around the smart watch (e.g., around the display of the wearable device, etc.). In some embodiments, the GUI elements comprise buttons; however, other types of GUI elements may be used in the virtual interface.

Subsequently, with the virtual interface being displayed, processing logic records a hand gesture of the user made with respect to one of the GUI elements (processing block 605) and recognizes the hand gesture as a selection of the one GUI element (processing block 606). In some embodiments, image data related to the movement of a user's hand (e.g., finger movement) is captured by cameras of the XR device and analyzed by the XR device to determine that a gesture was performed to indicate selection of one of the GUI elements. In response to this recognition, processing logic invokes a feature associated with the one GUI element (processing block 607). That is, XR device executes commands to perform actions and/or functions associated with selected virtual button.

Note that the virtual trackpad described above in FIGS. 3A-4 can be used in conjunction with the virtual shortcut menu interface described above in FIGS. 5A-6. For example, the virtual trackpad of the smart watch can be used to cause the virtual shortcut menu to appear. From that point, the user can invoke features using the virtual buttons around the smart watch and/or using the display surface of the smart watch. Other uses of these two techniques in combination would be recognized by those skilled in the art.

There are a number of example embodiments described herein.

Example 1 is a method comprising: detecting, by an extend reality (XR) device, a wearable device; communicably connecting the XR device to the wearable device; and manipulating a user interface in a virtual environment displayed on a display in the XR device with the wearable device.

Example 2 is the method of example 1 that may optionally include that manipulating the user interface comprises moving a cursor with the user interface based on detected motion made by a user on the wearable device that is sent to the XR device, the detected motion being moving one or more finger of the user across a display surface of the wearable device.

Example 3 is the method of example 1 that may optionally include that manipulating the user interface comprises selecting an object being displayed on the user interface based on detected motion made by a user on the wearable device that is sent to the XR device, the detected motion being a tap by the user on the display surface of the wearable device.

Example 4 is the method of example 1 that may optionally include that manipulating the user interface comprises scrolling a window being displayed on the user interface based on detected motion made by a user on the wearable device that is sent to the XR device, the detected motion being movement of one or more fingers by the user across a portion of the wearable device.

Example 5 is the method of example 4 that may optionally include that the at least one finger comprises two fingers and wherein the portion of the wearable device comprises a display of the wearable device.

Example 6 is the method of example 1 that may optionally include displaying a virtual interface in the user interface and in proximity to the wearable device and including user-selectable graphical user interface (GUI) elements.

Example 7 is the method of example 6 that may optionally include that the user-selectable GUI elements are virtual buttons.

Example 8 is the method of example 6 that may optionally include capturing movements of one or more fingers made by a user in relation to one of the GUI elements; recognizing the movements as a selection of the one GUI element; and invoking a feature associated with the one GUI element in response to recognizing the movements.

Example 9 is the method of example 1 that may optionally include that the virtual GUI elements are customizable to associate different features with each of the virtual GUI elements.

Example 10 is the method of example 1 that may optionally include: identifying, using a camera, a marker on the wearable device; and detecting position of the wearable device using the marker, wherein displaying the virtual interface in the user interface in proximity to the wearable device comprises displaying the virtual interface based on the position of the wearable device.

Example 11 is the method of example 10 that may optionally include that detecting position of the wearable device using the marker comprises detecting position of a display of the wearable device using the marker.

Example 12 is the method of example 1 that may optionally include that the virtual interface is displayed around the wearable device, and the wearable device comprises a smart watch device.

Example 13 is a computing system for controlling a user interface, the computing system comprising: one or more processors; and one or more memories storing instructions that, when executed by the one or more processors, cause the computing system to perform a process comprising: detecting, by an extend reality (XR) device, a wearable device; communicably connecting the XR device to the wearable device; and manipulating a user interface in a virtual environment displayed on a display in the XR device with the wearable device.

Example 14 is the computing system of example 13 that may optionally include that manipulating the user interface comprises moving a cursor with the user interface based on detected motion made by a user on the wearable device that is sent to the XR device, the detected motion being moving one or more finger of the user across a display surface of the wearable device.

Example 15 is the computing system of example 13 that may optionally include that manipulating the user interface comprises selecting an object being displayed on the user interface based on detected motion made by a user on the wearable device that is sent to the XR device, the detected motion being a tap by the user on the display surface of the wearable device.

Example 16 is the computing system of example 13 that may optionally include that manipulating the user interface comprises scrolling a window being displayed on the user interface based on detected motion made by a user on the wearable device that is sent to the XR device, the detected motion being movement of one or more fingers by the user across a portion of the wearable device.

Example 17 is the computing system of example 13 that may optionally include that the process further comprises: displaying a virtual interface in the user interface and in proximity to the wearable device and including user-selectable graphical user interface (GUI) elements.

Example 18 is the computing system of example 17 that may optionally include that the user-selectable GUI elements are virtual buttons.

Example 19 is the computing system of example 17 that may optionally include that the process further comprises: capturing movements of one or more fingers made by a user in relation to one of the GUI elements; recognizing the movements as a selection of the one GUI element; and invoking a feature associated with the one GUI element in response to recognizing the movements.

Example 20 is one or more non-transitory computer readable storage media having instructions stored thereupon which, when executed by a system having at least a processor and a memory therein, cause the system to perform operations comprising: detecting, by an extend reality (XR) device, a wearable device; communicably connecting the XR device to the wearable device; and manipulating a user interface in a virtual environment displayed on a display in the XR device with the wearable device.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Whereas many alterations and modifications of the present disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the disclosure.

We claim:

1. A method comprising:
   detecting, by an extend reality (XR) device, a wearable device;
   communicably connecting the XR device to the wearable device;
   displaying a virtual environment with a user interface, on a display in the XR device;
   displaying a virtual shortcut interface in the user interface next to and in proximity to the wearable device but not over the wearable device, including positioning the virtual shortcut interface based on a position of the wearable device determined using tracking markers on a display of the wearable device, the virtual shortcut interface including user-selectable virtual buttons that includes a home button to enable a user to go to a home screen or a main menu, a button for opening a browser, a back button for allowing a user to navigate to a previously viewed page in the user interface, a forward button for allowing a user to navigate to a previously viewed page in the user interface that was originally viewed after a currently displayed page, and one or more buttons from a group that includes a button for checking open applications, a button for causing another set of virtual buttons to be displayed in the virtual shortcut interface that include one or more buttons in a previously displayed set of buttons, and a user customizable button;
   capturing movements of one or more fingers made by a user in relation to one of the virtual buttons;
   recognizing the movements as a selection of the one of the virtual buttons;
   invoking a feature associated with the one virtual button in response to recognizing the movements, the feature including opening an application window with the browser in the user interface; and
   manipulating the user interface in the virtual environment with the wearable device, wherein manipulating the user interface comprises moving a cursor being displayed in the window or scrolling the window being displayed on the user interface based on detected motion made by a user on the wearable device that is sent to the XR device, the detected motion including movement of one or more fingers of the user across a display surface of the wearable device while providing physical feedback to the user and without watching the one or more fingers of the user.

2. The method of claim 1 wherein manipulating the user interface comprises selecting an object being displayed on the user interface based on detected motion made by a user on the wearable device that is sent to the XR device, the detected motion being a tap by the user on the display surface of the wearable device.

3. The method of claim 1 wherein the at least one finger comprises two fingers and wherein the portion of the wearable device comprises a display of the wearable device.

4. The method of claim 1 wherein the user-selectable GUI elements are virtual buttons.

5. The method of claim 1 wherein the virtual GUI elements are customizable to associate different features with each of the virtual GUI elements.

6. The method of claim 1 further comprising:
   identifying, using a camera, a marker on the wearable device; and
   detecting position of the wearable device using the marker,
   wherein displaying the virtual interface in the user interface in proximity to the wearable device comprises displaying the virtual interface based on the position of the wearable device.

7. The method of claim 6 wherein detecting position of the wearable device using the marker comprises detecting position of a display of the wearable device using the marker.

8. The method of claim 1 wherein the virtual interface is displayed around the wearable device, and the wearable device comprises a smart watch device.

9. A computing system for controlling a user interface, the computing system comprising:
one or more processors; and
one or more memories storing instructions that, when executed by the one or more processors, cause the computing system to perform a process comprising:
detecting, by an extend reality (XR) device, a wearable device;
communicably connecting the XR device to the wearable device;
displaying a virtual environment with a user interface, on a display in the XR device;
displaying a virtual shortcut interface in the user interface next to and in proximity to the wearable device but not over the wearable device, including positioning the virtual shortcut interface based on a position of the wearable device determined using tracking markers on a display of the wearable device, the virtual shortcut interface including user-selectable virtual buttons that includes a home button to enable a user to go to a home screen or a main menu, a button for opening a browser, a back button for allowing a user to navigate to a previously viewed page in the user interface, a forward button for allowing a user to navigate to a previously viewed page in the user interface that was originally viewed after a currently displayed page, and one or more buttons from a group that includes a button for checking open applications, a button for causing another set of virtual buttons to be displayed in the virtual shortcut interface that include one or more buttons in a previously displayed set of buttons, and a user customizable button;
capturing movements of one or more fingers made by a user in relation to one of the virtual buttons;
recognizing the movements as a selection of the one of the virtual buttons;
invoking a feature associated with the one virtual button in response to recognizing the movements, the feature including opening an application window with the browser in the user interface; and
manipulating the user interface in the virtual environment with the wearable device, wherein manipulating the user interface comprises moving a cursor being displayed in the window or scrolling the window being displayed on the user interface based on detected motion made by a user on the wearable device that is sent to the XR device, the detected motion including movement of one or more fingers of the user across a display surface of the wearable device while providing physical feedback to the user and without watching the one or more fingers of the user.

10. The computing system of claim 9 wherein manipulating the user interface comprises selecting an object being displayed on the user interface based on detected motion made by a user on the wearable device that is sent to the XR device, the detected motion being a tap by the user on the display surface of the wearable device.

11. The computing system of claim 9 wherein the user-selectable GUI elements are virtual buttons.

12. One or more non-transitory computer readable storage media having instructions stored thereupon which, when executed by a system having at least a processor and a memory therein, cause the system to perform operations comprising:
detecting, by an extend reality (XR) device, a wearable device;
communicably connecting the XR device to the wearable device; and
displaying a virtual environment with a user interface, on a display in the XR device;
displaying a virtual shortcut interface in the user interface next to and in proximity to the wearable device but not over the wearable device, including positioning the virtual shortcut interface based on a position of the wearable device determined using tracking markers on a display of the wearable device, the virtual shortcut interface including user-selectable virtual buttons that includes a home button to enable a user to go to a home screen or a main menu, a button for opening a browser, a back button for allowing a user to navigate to a previously viewed page in the user interface, a forward button for allowing a user to navigate to a previously viewed page in the user interface that was originally viewed after a currently displayed page, and one or more buttons from a group that includes a button for checking open applications, a button for causing another set of virtual buttons to be displayed in the virtual shortcut interface that include one or more buttons in a previously displayed set of buttons, and a user customizable button;
capturing movements of one or more fingers made by a user in relation to one of the virtual buttons;
recognizing the movements as a selection of the one of the virtual buttons;
invoking a feature associated with the one virtual button in response to recognizing the movements, the feature including opening an application window with the browser in the user interface; and
manipulating the user interface in the virtual environment with the wearable device, wherein manipulating the user interface comprises moving a cursor being displayed in the window or scrolling the window being displayed on the user interface based on detected motion made by a user on the wearable device that is sent to the XR device, the detected motion including movement of one or more fingers of the user across a display surface of the wearable device while providing physical feedback to the user and without watching the one or more fingers of the user.

* * * * *